United States Patent [19]

Bolles, Jr.

[11] Patent Number: 5,723,782
[45] Date of Patent: Mar. 3, 1998

[54] METHOD OF LAND VEHICLE SUSPENSION EVALUATION AND DESIGN THROUGH ROLL ANGLE ANALYSIS

[76] Inventor: Robert C. Bolles, Jr., 24 Park Pl., Ormond Beach, Fla. 32174

[21] Appl. No.: 759,086

[22] Filed: Nov. 29, 1996

[51] Int. Cl.$^6$ .................................................. G01C 21/00
[52] U.S. Cl. ........................................ 73/178 R; 73/146
[58] Field of Search ............................ 73/146, 178 R, 73/862.541

[56] References Cited

U.S. PATENT DOCUMENTS

| | | |
|---|---|---|
| 3,564,496 | 2/1971 | Brooks et al. . |
| 4,693,493 | 9/1987 | Ikemoto et al. ............ 280/707 |
| 5,233,901 | 8/1993 | Nilsson et al. . |
| 5,315,516 | 5/1994 | Miller et al. . |
| 5,315,868 | 5/1994 | Jacobbi et al. ............ 73/178 R |
| 5,319,939 | 6/1994 | Billing-Ross et al. . |
| 5,319,968 | 6/1994 | Billing-Ross et al. . |
| 5,351,540 | 10/1994 | Gee ........................... 73/178 R |
| 5,414,430 | 5/1995 | Hansen . |
| 5,435,193 | 7/1995 | Halliday ................... 73/862.541 |

*Primary Examiner*—Richard Chilcot
*Assistant Examiner*—Max H. Noori

[57] ABSTRACT

A method of land vehicle suspension evaluation and design through roll angle analysis. The method is based on predicting front roll angle and rear roll angle for a given road bank angle and lateral vehicle force. Method steps include determining a vehicle front section sprung weight, determining a vehicle rear section sprung weight, predicting a front roll angle, predicting a rear roll angle, comparing the predicted front roll angle XXXX to the predicted rear roll angle, and changing suspension components XXXXXXXX until the predicted front roll angle equals the predicted rear roll angle. Benefits associated with equalizing the front and rear roll angles include improved vehicle stability, increased total vehicle tractive capacity, and better handling.

1 Claim, 3 Drawing Sheets

42

62   64

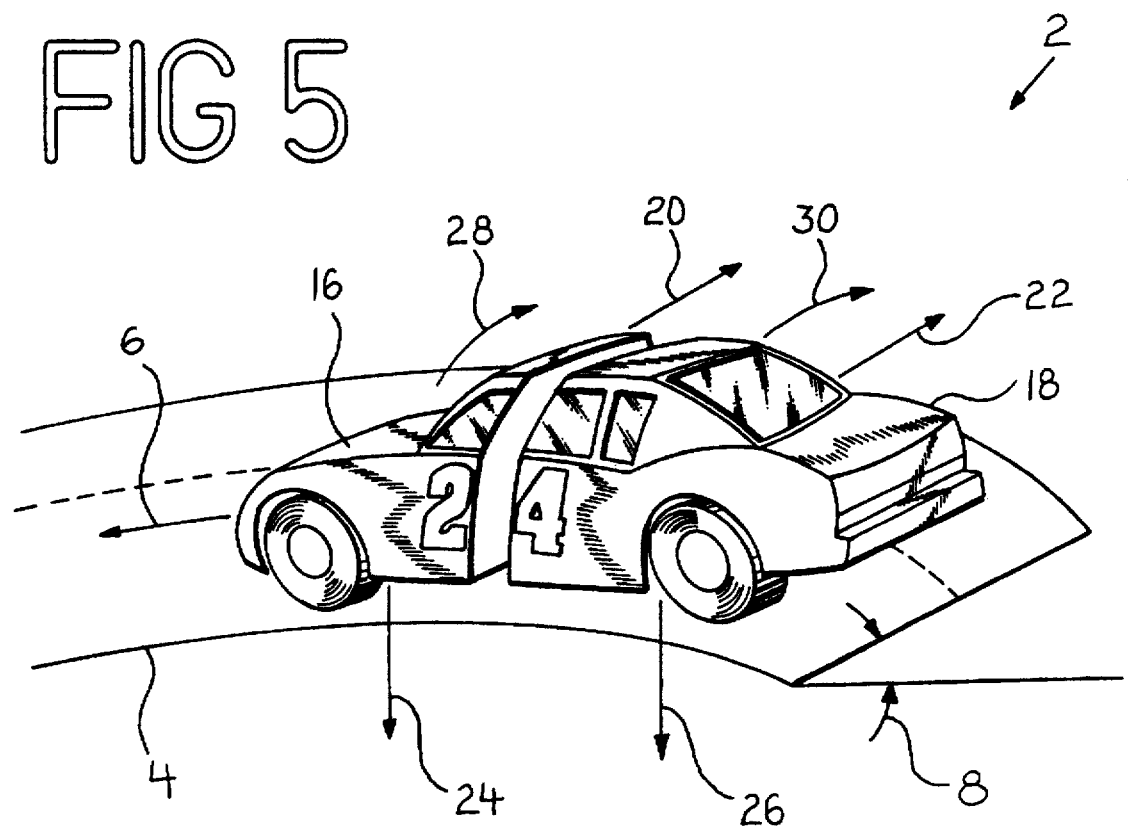

METHOD OF LAND VEHICLE SUSPENSION EVALUATION AND DESIGN THROUGH ROLL ANGLE ANALYSIS

BACKGROUND OF THE INVENTION

1. Field of the Invention

This invention relates to vehicle dynamics analysis, and in particular to a method of land vehicle suspension evaluation and design through roll angle analysis.

2. Background of the Invention

Since the advent of the powered land vehicle, engineers have striven to study its dynamics in order to improve its performance and ride. Significant aspects of vehicle dynamics in this context include tire behavior, vehicle aerodynamics, ride and roll rates, suspension geometry, wheel loads, steering and brake systems, suspension systems, and dampers such as shock absorbers. The study of these and other aspects of vehicle dynamics science has give rise to a considerable body of knowledge in the field, as exemplified by texts such as WILLIAM F. MILLIKEN AND DOUGLAS L. MILLIKEN, RACE CAR VEHICLE DYNAMICS (SAE International, 1995) and CARROLL SMITH, TUNE TO WIN (Aero Publishers, 1978), both of which are hereby incorporated by reference in their entireties.

One of the most important activities in "tuning" a land vehicle, especially a race car, is installing components which, for a given road bank angle and lateral force on the vehicle, will produce the same roll angle in the front of the vehicle as in the rear of the vehicle. If the suspension components are not balanced so as to produce the same roll angles in the front as in the rear, then one end of the vehicle will desire to assume a different roll angle than the other. This situation gives rise to a number of problems. Fundamental to all of the problems is the phenomenon that in a vehicle whose from and rear suspension system roll rates differ, each system (front and rear) will not be able to achieve its desired roll angle. In such a vehicle, each system will negatively influence the other, and will cause the opposite system to roll either more or less than it would in isolation.

A vehicle whose front roll rate differs from its rear roll rate will exhibit reduced stability. In addition, such a vehicle will have less overall tractive capacity than if its front and rear roll rates were equal. And because of the unequal roll rates, tires will suffer increased tire wear and heat buildup, leading to lessened tire life. Disadvantages such as these become especially important in high-performance environs such as auto racing, and can make a substantial improvement in performance.

Existing Methods

The currently accepted methods of roll angle prediction focus on determination of roll rates for a given vehicle. Roll rate is defined as the moment which resists vehicle body roll per degree of body roll, and is generally expressed in terms of pound-feet/degree (lb.-ft./deg.) or pound-feet/radian (lb.-ft./rad.).

Current vehicle modeling for roll rate prediction purposes accepts the vehicle as a solid body. First the roll center for each vehicle end is established. FIGS. 1 and 2 depict typical suspension configurations. FIG. 1 depicts a double A-arm suspension 40, having roll center 42. FIG. 2 illustrates a typical Panhard bar suspension 60 where a Panhard bar crosses the rear centerline 64 of the vehicle, having roll center 62.

The next step in current roll rate prediction is to find the vehicle roll axis. The roll axis is a line drawn through two roll centers.

The roll angle that a vehicle will then achieve under given conditions may then be calculated, using such conditions such as the vehicle sprung weight resting on each tire, the spring rates of each wheel's spring, roll center heights, vehicle sprung center of gravity height, etc.. In addition, dynamic variables such as road curvature, road bank angle and vehicle speed may be taken into account. For example, FIG. 4 is a rear view of a vehicle 2 traveling on a road 4 having road bank angle 8. The forward velocity of vehicle 2 combined with the road curvature will subject vehicle 2 to a lateral force as indicated by arrow 10. Under these circumstances, vehicle 2 will assume a roll angle.

One problem associated with current roll angle prediction is that the vehicle is modeled as being a rigid entity, producing a single roll angle. As previously noted, this type of unitary analysis may lead to divergent front and rear roll angles, with the attendant problems of reduced stability and non-optimal traction.

SUMMARY OF THE INVENTION

Accordingly, it is an object of the present invention to provide a method of land vehicle suspension evaluation and design through roll angle analysis which permits a front roll angle to be predicted independently from a rear roll angle for a vehicle which is traveling on a banked, curved road. Method steps allowing this object to be accomplished include weighing the vehicle, summing the sprung weight borne by the front tires, summing the sprung weight borne by the rear tires, using only that sprung weight borne by the front tires in the prediction of the front roll angle, and using only that sprung weight borne by the rear tires in the prediction of the rear roll rate. An advantage associated with the accomplishment of this object is that the predicted front roll angle may be directly compared to the predicted rear roll angle.

It is another object of the present invention to provide a method of land vehicle suspension evaluation and design through roll angle analysis which permits a vehicle to be configured such that for a given road bank angle and vehicle lateral force, the front and rear roll angles can be rendered equal. Method steps allowing this object to be accomplished include for a given road bank and vehicle lateral force, predicting the front roll angle, predicting the rear roll angle, and changing suspension components until the predicted front roll angle equals the predicted rear roll angle. Benefits associated with the accomplishment of this object include improved vehicle stability, increased total vehicle tractive capacity, reduced torsional twist in the vehicle chassis, more consistent handling characteristics as the vehicle transitions through changing surface conditions and varying lateral forces, smoother transfer of the desired weight within the front and rear suspension systems during the execution of a turn, and reduced tire wear and heat buildup.

It is still another object of this invention to provide a method of land vehicle suspension evaluation and design through roll angle analysis which is adaptable to computer implementation. Method features permitting the accomplishment of this object include a clear set of input variables and different outputs for predicted front roll angle and predicted rear roll angle. Advantages associated with the realization of this object include increased speed of method implementation and the associated facility of analyzing varying scenarios quickly and efficiently.

BRIEF DESCRIPTION OF THE DRAWINGS

The invention, together with the other objects, features, aspects and advantages thereof will be more clearly understood from the following in conjunction with the accompanying drawings.

Three sheets of drawings are provided. Sheet one contains FIGS. 1 and 2. Sheet two contains FIGS. 3 and 4. Sheet three contains FIG. 5.

FIG. 5 is a side isometric view of a vehicle on a banked, curved road, which for modeling purposes has been divided into a front section and a rear section.

DETAILED DESCRIPTION OF THE PREFERRED EMBODIMENT

The instant method provides a means to accurately predict front and rear roll angles for a given combination of road bank angle and lateral force produced on the vehicle due to road curve. Accurate front and rear roll angle predictions permit the designer to change suspension components so that the predicted front and rear roll angles will be equal. When the front and rear roll angles are equalized, vehicle stability, traction and handling are improved.

Figure 1:
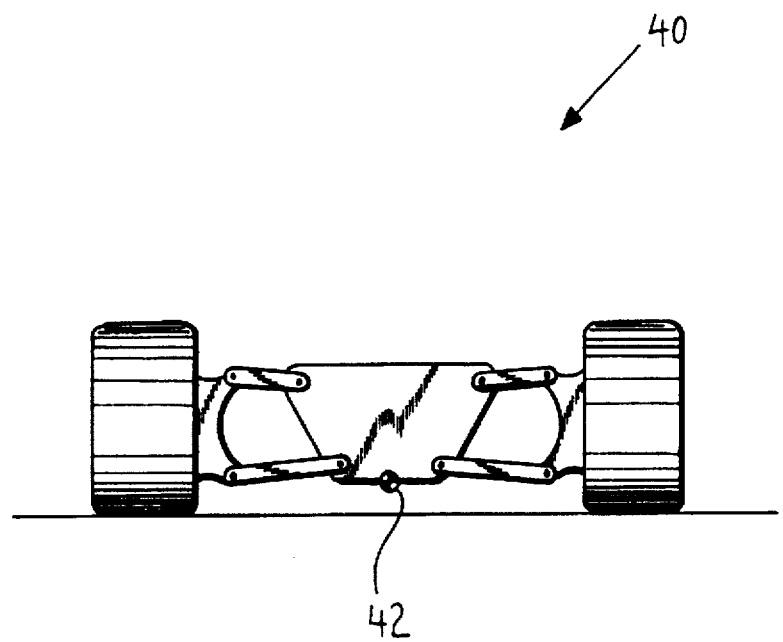
FIG. 1 is a rear isometric view of a typical double A-arm suspension system.
Figure 2:
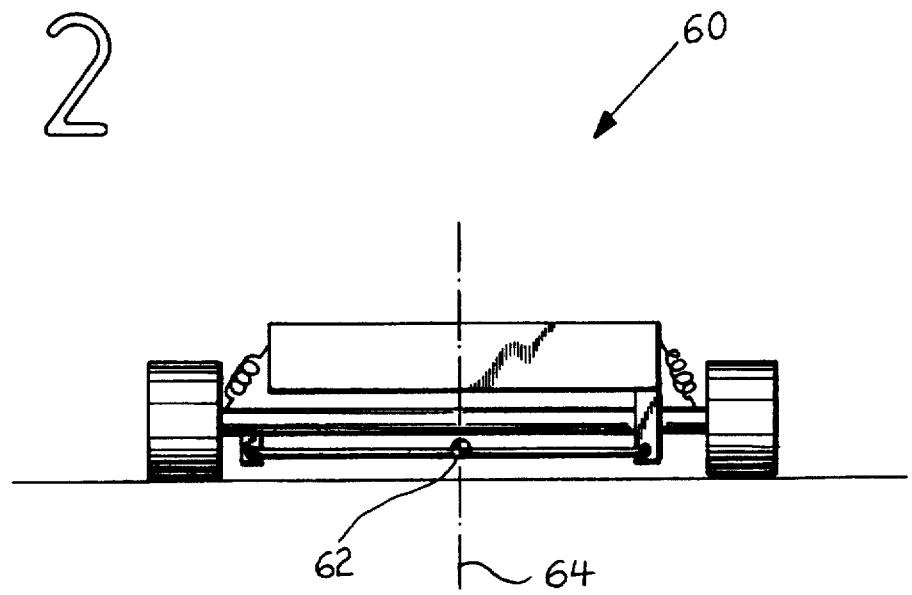
FIG. 2 is a rear isometric view of a typical Panhard bar suspension system.
Figure 3:
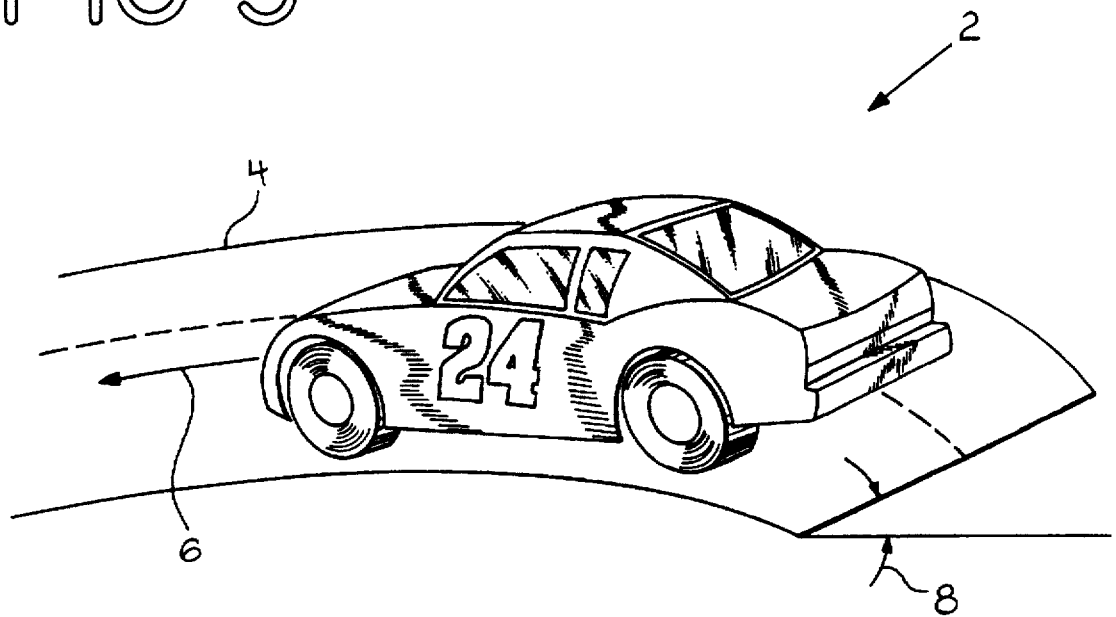
FIG. 3 is a side isometric view of a vehicle on a banked, curved road.

FIG. 3 is a side isometric view of vehicle 2 on road 4 traveling forward as indicated by arrow 6. Road 4 is built at a road bank angle 8 relative to horizontal. Because the path of vehicle 2 is constrained by the curve of road 4, vehicle 2 experiences a lateral force 10 due to its inertial tendency to keep traveling in a straight line.

Figure 4:
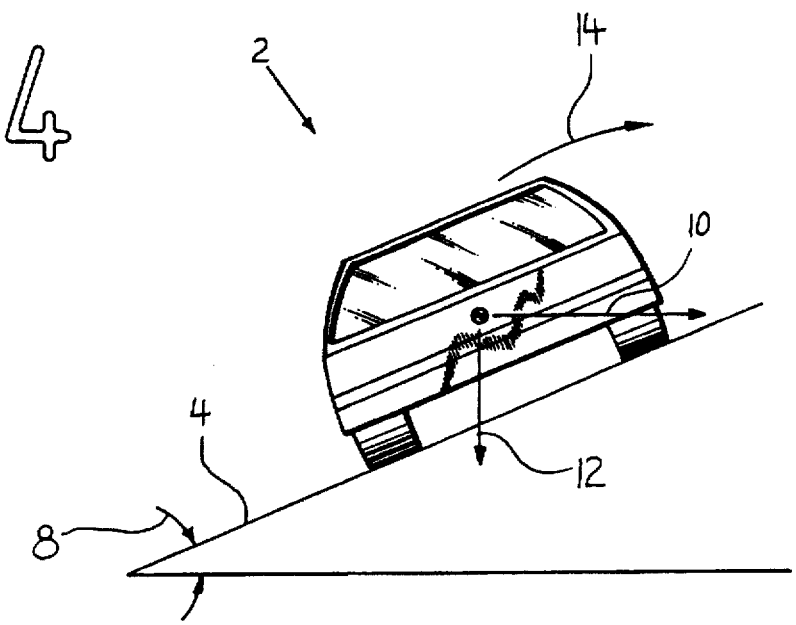
FIG. 4 is a rear view of a vehicle on a banked, curved road.

FIG. 4 is a rear view of vehicle 2 traveling on road 4. Because vehicle 2 is following curved road 4 against its inertial tendency to continue travel straight ahead, vehicle 2 is subjected to lateral force 10. In addition, vehicle 2 is under the influence of gravity, and so vehicle weight 12 is also acting on vehicle 2. Under the influence of these two forces, vehicle 2 will tend to roll as urged by lateral force 10 as indicated by arrow 14. This rolling tendency will be counteracted by vehicle weight 12, and unless lateral force 10 is excessive, vehicle 2 will tend to assume a predictable roll angle for a given road bank angle 8 and lateral force 10.

As previously discussed, conventional methods of predicting vehicle roll angle have treated the vehicle as a solid body, and involved determining roll rates, roll centers, and a roll axis. While these methods allowed prediction of a roll rate for the vehicle as a whole, they ignored the important fact that one end of the vehicle may be urged to assume a different roll angle than the opposite end.

The instant method approaches the problem of vehicle roll angle prediction in a drastically difference way. Vehicle 2 is modeled as comprising front section 16 and rear section 18.

FIG. 5 is a side isometric view of vehicle 2 traveling forward as indicated by arrow 6, on road 4 having road bank angle 8. Vehicle 2 is modeled as comprising two entities, a front section 16 having a front section sprung weight 24, and a rear section 18 having a rear section sprung weight 26.

Front section 16 is subjected to front section lateral force 20 and front section sprung weight 24. Front section lateral force 20 and front section sprung weight 24 will, in combination, urge front section 16 to assume a predictable front roll angle, as indicated by front roll arrow 28.

Rear section 18 is subjected to rear section lateral force 22 and rear section sprung weight 26. Rear section lateral force 22 and rear section sprung weight 26 will, in combination, urge rear section 18 to assume a predictable rear roll angle, as indicated by rear roll arrow 30.

The front roll angle is predicted, using such inputs as front section sprung weight 24, front section lateral force 20, the spring rates of each wheel's spring, roll center location, tread width, vehicle sprung center of gravity height, etc. In similar fashion, the rear roll angle is predicted, using such inputs as rear section sprung weight 26, rear section lateral force 22, the spring rates of each wheel's spring, roll center location, tread width, vehicle sprung center of gravity height, etc.

Once the front and rear roll angles have been predicted, the designer may adjust different suspension variables such as spring rates, and run the roll angle prediction calculation again, until the front roll angle and rear roll angle will be equal. Performing this iterative roll angle prediction calculation is especially well suited to be performed on a computer. After the predicted front and rear roll angles are equal, the vehicle will be balanced in roll for the given road bank angle 8 and lateral force 10 on the vehicle, and exhibit improved stability, tractive capacity, and handling. The specific steps of performing the instant method are as follow:

Method of Predicting Front Roll Angle and Rear Roll Angle for a Given Road Bank Angle and Lateral Vehicle Force:

A. Determining a vehicle front section sprung weight, which is the vehicle sprung weight borne by the front tires.

B. Determining a vehicle rear section sprung weight, which is the vehicle sprung weight borne by the rear tires.

C. Predicting a front roll angle using the vehicle front section sprung weight and a front section lateral force, in conjunction with such inputs as the spring rates of the front wheel suspensions (front left and front right), roll center location, sway bar diameter, tread width, front sprung center of gravity height, etc.

D. Predicting a rear roll angle using the vehicle rear section sprung weight and a rear section lateral force, in conjunction with such inputs as the spring rates of the rear wheel suspensions (rear left and rear right), rear roll center location, sway bar diameter, rear sprung center of gravity height, tread width, etc.

Method of Land Vehicle Suspension Evaluation and Design Through Roll Angle Analysis:

E. Comparing the predicted front roll angle with to the predicted rear roll angle as determined in steps A–D above.

F. Changing suspension components (such as springs) until the predicted front roll angle equals the predicted rear roll angle.

While a preferred embodiment of the invention has been illustrated herein, it is to be understood that changes and variations may be made by those skilled in the art without departing from the spirit of the appending claims.

DRAWING ITEM INDEX 2 vehicle
4 road
6 arrow
8 road bank angle
10 lateral force
12 vehicle weight
14 arrow 16 front section
18 rear section
20 front section lateral force
22 rear section lateral force
24 front section sprang weight
26 rear section sprung weight
28 from roll angle
30 rear roll angle
40 double A-arm suspension system
42 roll center
60 Panhard bar suspension
62 roll center
64 centerline

I claim:

1. A method for improving a land vehicle suspension by predicting and equalizing front and rear roll angles for a given road bank angle and a lateral vehicle force, the method comprising:

a. determining the said vehicle front section sprung weight, which is defined by the vehicle sprung weight borne by the said vehicle front tires;

b. determining the said vehicle rear section sprung weight, which is defined by the vehicle sprung weight borne by the said vehicle rear tires;

c. predicting a front roll angle using the said vehicle front section sprung weight and a front section lateral force along with the said vehicle suspension variable measurements and track banking angle, in conjunction with inputs of spring rates of the said vehicle's front left and right wheel suspensions, roll center location, sway bar diameter, front sprung center of the gravity height;

d. predicting a rear roll angle using the said vehicle rear section sprung weight and a rear section lateral force along with the said vehicle suspension variable measurements and track banking angle, in conjunction with inputs of spring rates of the said vehicle's rear left and right wheel suspensions, roll center location, sway bar diameter, rear sprung center of the gravity height;

e. comparing the predicted front roll angle to the predicted rear roll angle as determined in steps a–d; and f. changing the said suspension variables until the said predicted front roll angle equals to the said predicted rear roll angle.

* * * * *